United States Patent
Preetham et al.

(10) Patent No.: US 9,177,046 B2
(45) Date of Patent: Nov. 3, 2015

(54) REFINING IMAGE RELEVANCE MODELS

(71) Applicant: Google Inc., Mountain View, CA (US)

(72) Inventors: Arcot J. Preetham, Cupertino, CA (US); Thomas J. Duerig, Sunnyvale, CA (US); Charles J. Rosenberg, Cupertino, CA (US); Yangli Hector Yee, San Francisco, CA (US); Samy Bengio, Los Altos, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 14/543,312

(22) Filed: Nov. 17, 2014

(65) Prior Publication Data
US 2015/0161482 A1 Jun. 11, 2015

Related U.S. Application Data

(63) Continuation of application No. 13/545,222, filed on Jul. 10, 2012, now Pat. No. 8,891,858.

(60) Provisional application No. 61/541,543, filed on Sep. 30, 2011.

(51) Int. Cl.
*G06K 9/62* (2006.01)
*G06F 17/30* (2006.01)
*G06K 9/66* (2006.01)
*G06K 9/52* (2006.01)

(52) U.S. Cl.
CPC ...... *G06F 17/30675* (2013.01); *G06F 17/3028* (2013.01); *G06K 9/52* (2013.01); *G06K 9/6202* (2013.01); *G06K 9/6256* (2013.01); *G06K 9/6262* (2013.01); *G06K 9/6296* (2013.01); *G06K 9/66* (2013.01)

(58) Field of Classification Search
None
See application file for complete search history.

(56) References Cited

U.S. PATENT DOCUMENTS

| 8,489,627 B1* | 7/2013 | Brandt | 707/765 |
| 2002/0069218 A1* | 6/2002 | Sull et al. | 707/501.1 |
| 2008/0097981 A1 | 4/2008 | Williams | |
| 2011/0106782 A1* | 5/2011 | Ke et al. | 707/706 |

OTHER PUBLICATIONS

Deng et al, "Tri-training and Data Editing Based Semi-supervised Clustering Algorithm," 2006, MICAI 2006, LNAI 4293, pp. 641-651.*

* cited by examiner

*Primary Examiner* — Bhavesh Mehta
*Assistant Examiner* — David F Dunphy
(74) *Attorney, Agent, or Firm* — Fish & Richardson P.C.

(57) ABSTRACT

Methods, systems and apparatus for refining image relevance models. In general, one aspect of the subject matter described in this specification can be implemented in methods that include re-training an image relevance model by generating a first re-trained model based on content feature values of first images of a first portion of training images in a set of training images, receiving, from the first re-trained model, image relevance scores for second images of a second portion of the set of training images, removing, from the set of training images, some of the second images identified as outlier images for which the image relevance score received from the first re-trained model is below a threshold score, and generating a second re-trained model based on content feature values of the first images of the first portion and the second images of the second portion that remain following removal of the outlier images.

20 Claims, 3 Drawing Sheets

REFINING IMAGE RELEVANCE MODELS

This application is a continuation of, and claims priority to, U.S. patent application Ser. No. 13/545,222, now U.S. Pat. No. 8,891,858, title "Refining Image Relevance Models," filed on Jul. 10, 2012, which claims the benefit under 35 U.S.C. §119(e) of U.S. Provisional Application No. 61/541,543, filed on Sep. 30, 2011. The disclosure of the foregoing application are incorporated herein by reference in their entirety for all purposes.

BACKGROUND

This specification relates to data processing and refining image relevance models.

An image search apparatus can use an image relevance model to evaluate relevance between textual user queries and images. For example, the relevance of an image to a user query can be determined, in part, based on textual content depicted in the image or textual content associated with the image, e.g., textual content appearing on a web page in association with the image. The image relevance model can be further improved by analyzing the way in which users who submit user queries interact with images responsive to the user queries. For example, an image search system may respond to a user query with one or more images, which are then displayed on a user device. If the user clicks on or otherwise interacts with one or more images, then the image relevance model can sometimes infer that those images were good (relevant) responses to the user query. If a particular image satisfies an image relevance threshold, e.g., a certain number of users click on the image when the image is presented as responsive to a user query, then the image relevance model may label the image with a reference to the user query, e.g., a term included in the query, based on the determination that the user query accurately describes the image.

Further, the image relevance model can be used to identify visual features of multiple images that have been identified as relevant to the same query. For example, multiple images that have been identified as relevant to the same query may have similar visual features, such as similar colors, brightness, shapes, edge locations, and/or other similar attributes. For example, images associated with the query "sunrise" will likely share similar colors (of a sky at sunrise) and shapes (of a sun appearing on the horizon). The attributes identified by the image relevance model can be used to further identify other images sharing the same common features that may also be relevant to a query.

SUMMARY

In general, one aspect of the subject matter described in this specification can be implemented in methods that include the actions of receiving a trained image relevance model that generates relevance measures of images to a query, wherein the trained image relevance model has been trained based on content feature values of a set of training images, the query being a unique set of one or more query terms received by a search system as a query input, and re-training the image relevance model, the re-training comprising generating a first re-trained image relevance model based on content feature values of first images of a first portion of training images in the set of training images, receiving, from the first re-trained image relevance model, image relevance scores for second images of a second portion of the set of training images, removing, from the set of training images, at least some of the second images of the second portion of the set training images identified as outlier images, the outlier images being training images for which the image relevance score received from the first re-trained image relevance model is below a threshold score, and generating a second re-trained image relevance model based on content feature values of the first images of the first portion and the second images of the second portion that remain following removal of the at least some of the second images of the second portion of the set of training images. This and other implementations of this aspect include corresponding systems, apparatus, and computer program products.

Implementations of this aspect may include one or more of the following features. Receiving image relevance scores includes receiving image relevance scores for the second images of the second portion of the set of training images that were not included in the first portion of the set of training images. The aspect includes generating multiple re-trained image relevance models based on content feature values of multiple distinct portions of the set of training images. The aspect includes generating the multiple distinct portions of the set of training images, wherein each of the multiple distinct portions is generated to include less than 100 percent of the images in the set of training images. Each of the multiple distinct portions includes at least one image that is not included in another distinct portion. The aspect includes generating an aggregation of near duplicate images among the set of training images, and associating image selection data of the near duplicate images with the aggregation of the near duplicate images. The aggregation of near duplicate images includes fewer than a threshold number of near duplicate images.

Particular implementations of the subject matter described in this specification can be implemented so as to realize one or more of the following advantages. An image relevance model can be refined to better correlate text queries with images.

The details of one or more implementations are set forth in the accompanying drawings and the description below. Other features, aspects, and advantages will be apparent from the description and drawings, and from the claims.

DESCRIPTION OF DRAWINGS

Like reference symbols in the various drawings indicate like elements.

DETAILED DESCRIPTION

An image relevance model can be trained based on which images a user interacts with, e.g., clicks or hovers a pointer over or touches on a touchscreen, in response to a textual user query. However, sometimes the user clicks are not accurate indicators of relevance between an image and a query. For example, an image returned in response to a query might not relate to the query but catch the user's interest for reasons unrelated to the query, e.g., the image is humorous, or the image concerns another unrelated interest of the user, and so the user clicks on the image. Thus, the image relevance model data will contain outliers in the form of images that are not semantically related to queries with which the images have been associated in the model. Visual features of these outlier images will be included in the model data unless the outlier images are removed.

The outlier images can be removed by an image relevance refinement process, and the image relevance model can be re-trained following the removal. In some implementations, the refinement process is performed by an image search apparatus that receives a set of images that were used to train a model for a particular query. The image search apparatus splits the images for the query into subsets and trains temporary sub-models using the subsets. The image search apparatus then calculates image relevance scores for the images and determines which images have the lowest relevance scores. Images having relevance scores below a threshold are removed from the set of images.

For example, training images that were used to train an image relevance model for a particular query can be received. The training images can be used to train a number of sub-models, where each of the sub-models is trained using N %, e.g., 75% or 95%, of the training images that were used to train the original image relevance model. Then each of the sub-models can be used to compute image relevance scores for the remaining 100–N %, e.g., 25% or 5% of the training images that were not used to train that sub-model. If an image has a relevance score that is below a pre-specified threshold score, which means the image shares few visual features in common with the remaining images, then this image can be identified as an outlier and possibly be removed from the full set of training images.

In turn, the image search apparatus can generate a new image relevance model for the query based on the training images that remain in the set following removal of the outlier images.

Figure 1:
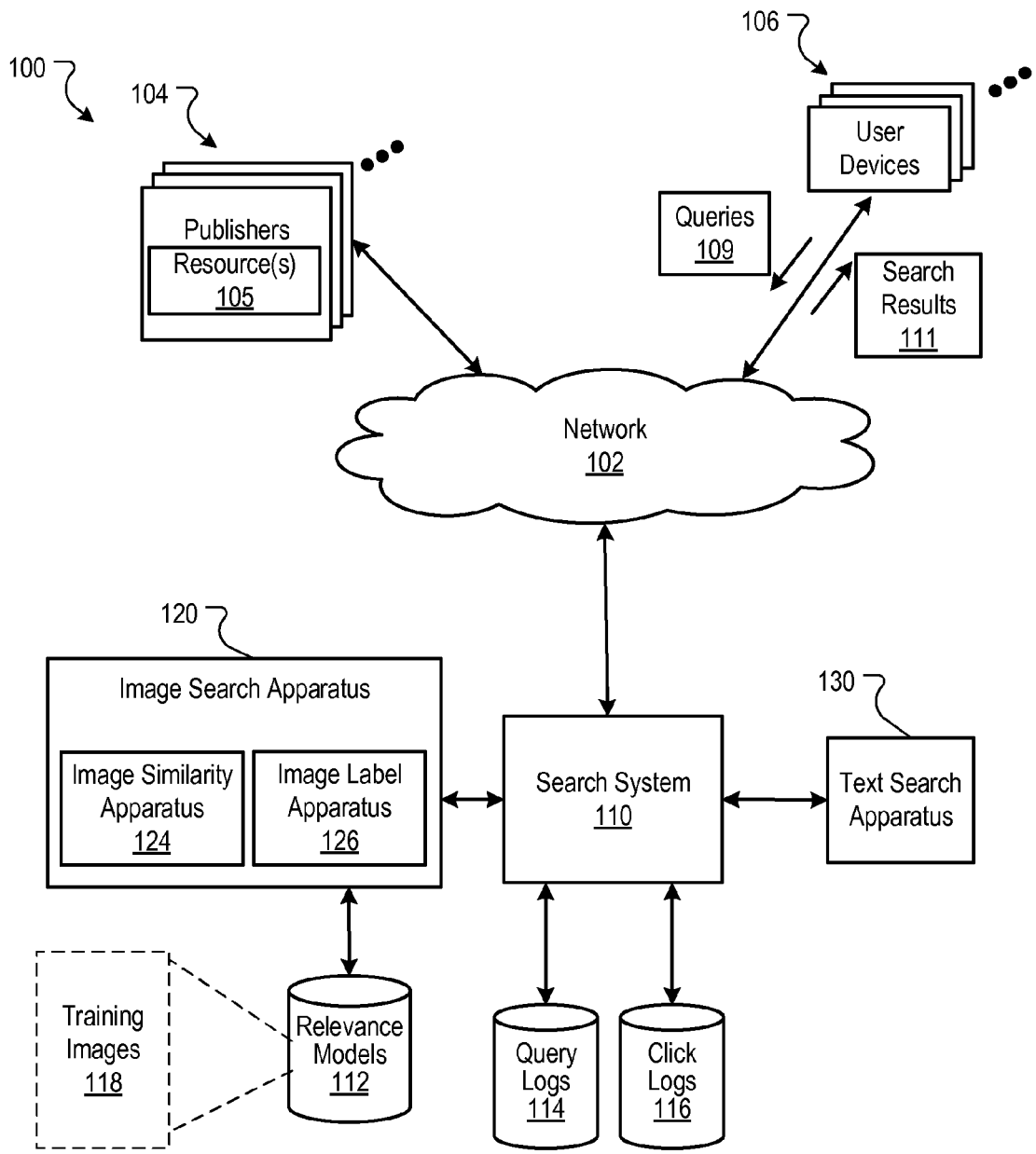
FIG. 1 is a block diagram of an example environment in which a search system provides search services.

FIG. 1 is a block diagram of an example environment 100 in which a search system 110 provides search services. The example environment 100 includes a network 102, e.g., a local area network (LAN), wide area network (WAN), the Internet, or a combination of them, connects web sites 104, user devices 106, and the search system 110. The environment 100 may include many web sites 104 and user devices 106 (which are also sometimes referred to as client devices).

A web site 104 is a facility containing one or more resources associated with a domain name and hosted by one or more servers. An example web site is a collection of web pages formatted in hypertext markup language (HTML) that can contain text, images, multimedia content, and programming elements, e.g., scripts. Each web site 104 is maintained by a publisher, e.g., an entity that manages and/or owns the web site.

A resource is any data that can be provided by the web site 104 over the network 102 and that is associated with a resource address. Resources include HTML pages, word processing documents, and portable document format (PDF) documents, images, video, and feed sources, to name just a few. The resources can include content, e.g., words, phrases, images and sounds and may include embedded information, e.g., meta information and hyperlinks, and/or embedded instructions, e.g., scripts.

A user device 106 is an electronic device that is under control of a user and is capable of requesting and receiving resources over the network 102. Example user devices 106 include personal computers, mobile communication devices, and other devices that can send and receive data over the network 102. A user device 106 typically includes a user application, e.g., a web browser, to facilitate the sending and receiving of data over the network 102.

To facilitate searching of resources, the search system 110 identifies the resources by crawling and indexing the resources 105 provided by the web sites 104. Data about the resources can be indexed based on the resource to which the data corresponds.

The user devices 106 submit search queries 109 to the search system 110. In response, the search system 110 identifies resources that are responsive to, e.g., have at least a threshold relevance score for, the search query 109. The search system 110 generates search results 111 that identify the resources and returns the search results 111 to the user devices 106. A search result 111 is data generated by the search system 110 that identifies a resource that is responsive to a particular search query, and includes a link to the resource. An example search result 111 can include a web page title, a snippet of text or a portion of an image extracted from the web page, and the URL of the web page. For example, the search queries 109 can be submitted during user sessions in which a user of a user device 106 enters search queries into a user interface. During a user session, the user can be presented with search results 111.

Search results are ranked based on scores related to the resources identified by the search results, such as information retrieval ("IR") scores, and optionally a quality score of each resource relative to other resources. In some implementations, the IR scores are computed from dot products of feature vectors corresponding to a search query 109 and a resource, and the ranking of the search results is based on relevance scores that are a combination, e.g., sums, products, or other mathematical combinations, of the IR scores and quality scores. In some examples, the search results 111 can be ordered at least partially according to these relevance scores and provided to the user device according to the order.

The user devices 106 receive the search results, e.g., in the form of one or more web pages, and render the pages for presentation to users. In response to the user selecting a link in a search result at a user device 106, the user device 106 requests the resource identified by the link. The web site 104 hosting the resource receives the request for the resource 105 from the user device 106 and provides the resource to the requesting user device 106.

In some implementations, a search query 109 can include data for a single query type or for two or more query types (e.g., types of data in the query). For example, the search query 109 may have a text portion, and the search query may also have an image portion. A search query 109 that includes data for two or more query types can be referred to as a "hybrid query." In some examples, a search query 109 includes data for only one type of query. For example, the search query 109 may only include image query data (e.g., a query image), or the search query may only include textual query data (e.g., a text query).

In some implementations, the search system 110 includes an image search apparatus 120 that is used to process queries to identify images that are responsive to (e.g., semantically related) to the search query 109. For example, a query 109 may include text with which the search system 110 can perform an image search (e.g., a search for images that are responsive to the text).

The term "semantic relatedness" refers to the relatedness between text and images. A portion of text and an image are semantically related if the text describes a topic of an image or otherwise has a relationship with the content of the image. Generally, text is semantically related to an image if the text is similar to or relevant to a topic of the image. For example, the text "fish" is semantically related to an image of a mackerel. The degree to which text is semantically related can be quantified. For example, a confidence score may use used to indicate the degree to which text is accurately related to an image.

In some implementations, the search system 110 also includes a text search apparatus 130 that is used to perform a search based on a text query (e.g., text submitted by the user devices 106 as a portion of a query 109). The text search apparatus 130 can also perform a search based on a label for an image that was submitted by a user device 106 as a portion (all or a proper subset) of a query 109. For example, as described below, the label could be a label associated with (e.g., indexed according to and/or stored with a reference to) the image by an image label apparatus 126.

An image label ("label") is data that is indicative of subject matter to which an image is relevant. Labels can be explicitly specified by a publisher of a web site 104 on which the image appears. Labels can also be generated, for example, based on text that appears near the image on the web page. For example, a label can be generated for an image based on text that is located adjacent to, e.g., within a threshold number of pixels of, the image or in a portion of a document that is identified as containing information relevant to the image, e.g., a frame in which the image is presented. A label can also be generated based on text that is included in the image, e.g., visually depicted in the image, or otherwise associated with the image, e.g., text included in a file name, text included in anchor text of a link to the image, or resource location of the image. The image label apparatus 126 can generate labels for images.

The queries submitted during the user sessions can be stored in query logs 114. Selection data defining actions taken responsive to search results provided for the user sessions can be stored in click logs 116. These actions can include whether a search result was selected, e.g., whether a user interacted with the search result. The query logs 114 and click logs 116 can be used to map queries submitted during user sessions to resources that were identified in search results and the actions taken by users. If time data are also stored, then the relative times at which those actions were taken can also be determined. The click logs and query logs can be used to map queries submitted during user sessions to resources that were identified in response to the queries and that were selected by the users of the user devices 106.

In some implementations, query data and image selection data (e.g., click data) are stored in the query logs 114 and click logs 116 for each unique query submitted by users. The query data are data that define queries of one or more words that were received, for example, as search queries 109. For example, if the queries "dolphin", "exhibits", and "dolphin exhibits" are each received by the search system 110, then query data and click data are stored in the query logs 114 and click logs 116 for each of the queries "dolphin", "exhibits", and "dolphin exhibits".

In some examples, the query logs 114 and click logs 116 can be used to generate image relevance models 112. Because the image search apparatus 120 processes each search query as a whole, it can create a corresponding image relevance model 112 for each query. When selecting images for reference in image search results responsive to a particular query, the image search apparatus 120 calculates the relevance measures based on an image relevance model 112 that is associated with that particular query.

Before the image relevance models 112 are used, they are generally trained by the image search apparatus 120. At a high level, the image search apparatus 120 can train an image relevance model 112 for each query by first selecting training images 118 that are relevant to that query and other images that are relevant to other queries. In some implementations, content feature values (i.e., values indicative of visual features of the image and/or other image features) for each image are extracted and are transformed into a sparse representation using a pre-computed dictionary of visual terms that represent a set of regions having similar content feature values. The extraction and transformation yields a "bag of features" for the image. Generally, the content feature values of an image quantitatively represent visual features of the image.

Thereafter, an image relevance model 112 for each query is learned. The image relevance model 112 is of the form that generates a score for an image based on the sparse representation of the image, e.g., $$IRS = W * X$$

where IRS is an image relevance score, X is a sparse vector of content feature values representing an image, and W is a vector of parameters, e.g., feature weights, learned for the model.

The technique described here only represents some implementations for determining content feature values. Other implementations can use other techniques to determine content feature values. For examples, some implementations can use a non-linear model for associating content feature values and feature weights.

To select training images 118, the image search apparatus 120 identifies images as being relevant to a query based on a relevance measure between the image and the query. In some implementations, the relevance measure is based on a relevance feedback score. The relevance feedback score is a relevance measure that is generated based on user actions in response to an image appearing in search results. For example, click data specifying a number of times an image was selected from search results for a query can represent a measure of the relevance of the image to the query. Thus, the image search apparatus 120 can derive the relevance measure, based at least in part on, the click logs 116 and query logs 114, e.g., based on numbers of times that images were presented in response to particular queries and numbers of times that users interacted with the images when presented.

Each image relevance model 112 is trained to determine the relevance of an image to a query, e.g., one of the queries 109, based on content feature values of images for which a relevance feedback score is available. In turn, the image relevance model can be applied to content feature values of other images to determine a relevance score for the other images relative to the query. For example, the content feature values can be input to the image relevance model, which can compute and output the relevance score.

The image search apparatus 120 applies an independent image relevance model 112 to content feature values of the images for each unique query, e.g., unique set of terms submitted as a query, that is identified by the image search apparatus 120. Using a separate image relevance model 112 for each query rather than using an image relevance model for each constituent term in the query reduces the overhead associated with identifying search results for a query. For example, the image relevance models 112 for the queries can be trained independently and in parallel, as they are not required to consider the output of other image relevance models 112 for other queries. Additionally, only one image relevance model 112 need be processed for each query, which reduces resources when selecting images to reference in image search results for a query.

When the image relevance model 112 receives an image as input, the image relevance model 112 can output a relevance score indicating the degree to which the input image is related to the query represented by the image relevance model 112. The reliability of the relevance score as an indication of image relevance to a particular query is generally dependent on the accuracy of relevance feedback as a relevance indicator.

The image search apparatus 120 includes an image similarity apparatus 124 and an image label apparatus 126. As described in detail below, the image similarity apparatus 124 generates data indicative of the visual similarity of images to a query image, and the image label apparatus 126 generates labels (e.g., textual data) indicative of a topic or subject matter to which images are related, or are otherwise semantically related to images.

The description that follows describes the image similarity apparatus 124, image label apparatus 126, as well as processes that can be implemented by these and other apparatus. These apparatus and related processes are described with reference to a search query that includes search queries 109 and search results 111 that have been identified as responsive to the search query. However, each respective apparatus and process can be implemented with different processing systems and for different operational environments.

The image similarity apparatus 124 includes one or more processors configured to identify images that are near duplicate images to an image received by the image similarity apparatus 124 as input. In some implementations, near duplicate images are images that are identical except for differences in the way the images have been processed. In general, the differences between two near duplicate images are differences other than differences in visual features of the images. As one example, two identical images at different resolutions are near duplicate images. As another example, two images of the same object having different brightness, contrast, or other image attributes, e.g., image attributes adjusted in image processing software, can be near duplicate images. As another example, an uncropped version of an image and a cropped version of the same image, e.g., cropped to remove a border in the image, can be near duplicate images. Images can be identified as near duplicate images if they satisfy a similarity threshold, e.g., a similar score determined by the image similarity apparatus 124 that exceeds a similarity threshold.

The image label apparatus 126 can receive an image as input and the image label apparatus 126 can return one or more labels that describe a topic of or are otherwise semantically related to the image. In some examples, the image label apparatus 126 can identify a label that is semantically related to an image because the image label apparatus 126 already stores data describing the image, including data indicating which labels are semantically related to the image. In some examples, the image label apparatus 126 can consult an image relevance model 112 to identify a label based on visual features of the image. For example, the image label apparatus 126 can provide the image to an image relevance model 112 for a particular query to determine the degree to which the image is relevant to the query. The query can then be used as a label for the image.

Image labels can also be used to identify images that are responsive to a query. For example, the image relevance model 112 for the query can indicate which images are most relevant to the query. However, misdescriptive labels, e.g., labels that do not accurately describe an image, can result in unrelated images being improperly identified as responsive to a search query. For example, if an image of a baseball and an image of an egg are each associated with a common label (e.g., "egg") then these images may both appear in search results responsive to a query image of an egg even though the label "egg" is unrelated to the image of the baseball.

Because the image label apparatus 126 may associate labels with images based on user interaction with images responsive to search queries, misdescriptive labels may be associated with images based on user interaction with an image. For example, click data may indicate that an image is frequently clicked (or otherwise selected) in response to a search query. While this click data usually implies that the image is relevant to the search query, the image may have been clicked by users for reasons unrelated to its relevance to the search query. For example, the image may be humorous, catching the attention of the user who clicked or selected the image, or the image may concern another unrelated interest of the user. Generally, image relevance models 112 are trained based on information describing user interaction with images and content feature values for those images. For example, the image search apparatus 120 uses user interaction data such as the query logs 114 and click logs 116 to train the image relevance models 112. The image relevance models 112 can be further refined based on information other than information about user interaction with images. For example, the image relevance models 112 can be refined to reduce the occurrence of images not relevant to a query being identified as relevant by an image relevance model 112.

Figure 2A:
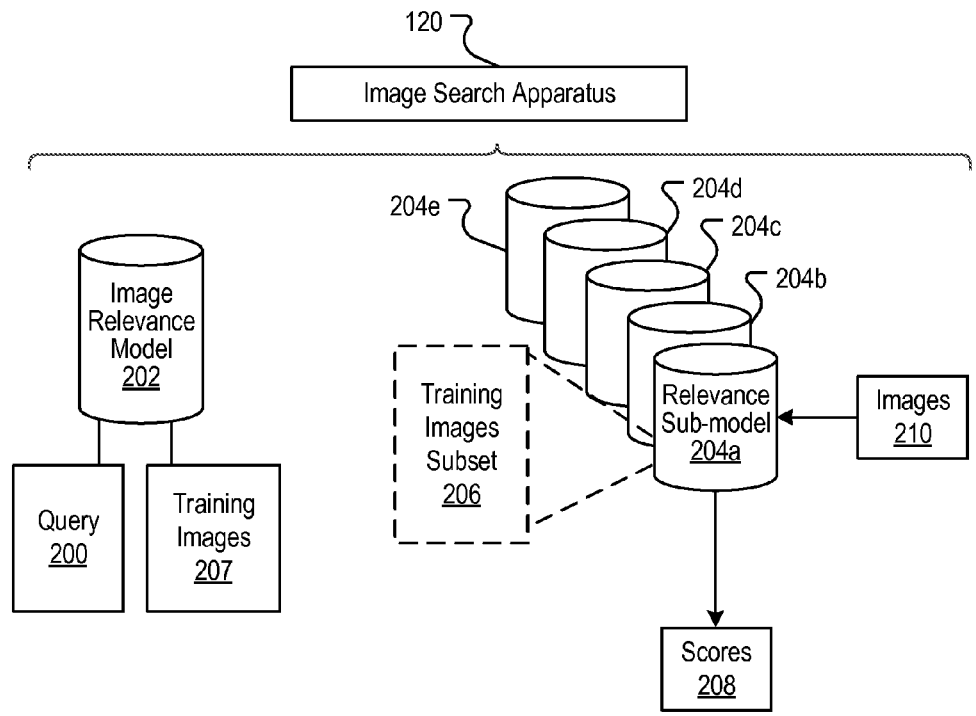
FIG. 2A is a block diagram illustrating image relevance model refinement

FIG. 2A is a block diagram illustrating image relevance model 202 refinement. In some examples, the image search apparatus 120 can re-train an image relevance model for a particular query 200 by removing outlier images, i.e., images that are not relevant to the query, from the set of training images 207 that was used to train the model.

In some implementations, the image search apparatus 120 generates multiple image relevance sub-models 204a-e for a particular query. For example, one image relevance sub-model 204a can be trained using a subset of the training images. The training images subset 206 represents a portion of the original set of training images 207. For example, the training images subset 206 could contain 75% or 95% or another fractional percentage of the original set of training images. Each image relevance sub-model 204a-e can be trained by the image search apparatus 120 in a similar way that the original image relevance model (e.g., the image relevance model 112 shown in FIG. 1) was trained. For example, the same query logs 114 and click logs 116 (FIG. 1) can be used, or updated versions of the query logs and click logs containing more recently collected data, can be used.

The image relevance sub-model 204a can then be used to provide relevance scores 208 for other images 210. For example, content feature values for the other images can be input into the sub-model 204a, which in turn, computes and outputs image relevance scores for the other images. The other images 210 could be the remaining 20% of the images in the training images subset 206 that were not used to train the sub-model 204a.

Images having a relevance score below a threshold can be identified as having a "low" relevance score. If the image relevance sub-model 204a is applied to the other images 210, and the image relevance sub-model 204a determines that some of the other images 210 have a low relevance score 208, then the images having a low relevance score 208 may be "outlier images" that are not relevant to the query 200. In some implementations, the outlier images are identified based on their low relevance score 208 and removed from the training images 207. Additional outlier images can also be identified based on the relevance scores output by the other image relevance sub-models 204b-e and removed from the training images 207. The image relevance model 202 can then be re-trained by the image search apparatus 120 using the modified set of training images 207 (i.e., the images in the set of training images that remain following removal of the outlier images) using similar processes that were used to originally train the image relevance model 202.

Figure 2B:
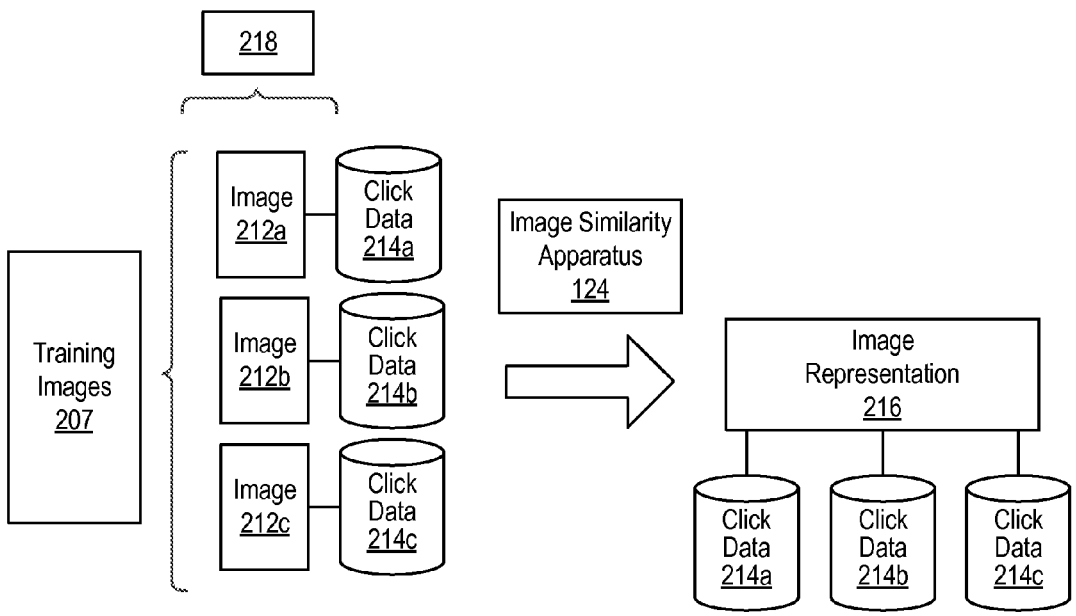
FIG. 2B is a block diagram illustrating identification of images as near duplicate images by an image similarity apparatus.

In some examples, the set of training images 207 contains images which are near duplicates of each other. Near duplicate images can be identified and associated with each other to further improve the accuracy of the image relevance model 202. FIG. 2B is a block diagram illustrating identification of images as near duplicate images by an image similarity apparatus. As described above, the image similarity apparatus 124 can identify images which are near duplicates. An image relevance model 202 for the query 200 provides an indication of the degree to which a query is relevant to an image. Generally, a query 200 that is relevant to an image will be equally relevant to another image that is a near duplicate of the image. However, one of the near duplicate images 212a may have been clicked infrequently relative to another one of the duplicate images 212b. For example, the second instance of the image may be presented lower in the search results such that users may click on the first instance of the image without then clicking on the second instance of the image. Given this data, the image relevance model 202 may be erroneously trained to indicate that the first near duplicate image 212a is less relevant to the query 200 than the second near duplicate image 212b, even though the two images are equally relevant. Thus, for purposes of the training images 207 used with the image relevance model 202, images that are near duplicates can be identified as the same image. Further, the click data associated with the near duplicate images can be aggregated together, such that the images in aggregate will be processed as though they were one image that has been clicked more times than the number of times any one of the individual images has been clicked.

For example, the near duplicate images 212a-c each have independent sets of click data 214a-c, e.g., click data stored in the click logs 116 (FIG. 1). The click data 214a-c indicates statistical information about the number of times the images 212a-c have been clicked when presented as responsive to the query 200. Near duplicate images 212a-c in the set of training images 207 can be associated with each other and "collapsed" into an aggregation of the images which represents the images as a single image.

The image similarity apparatus 124 can be used (e.g., by the image search apparatus 120) to generate an association of the near duplicate images 212a-c in the form of an image representation 216. In some implementations, the image representation 216 represents all of the near duplicate images 212a-c. In some examples, the image representation 216 can be an image reference to the near duplicate images 212a-c, and the near duplicate images 212a-c for the image reference 216 can be set aside from the training images 207 when the training images 207 are used to train the image relevance model 202. In some examples, the image representation 216 can be one of the near duplicate images 212a-c, and the other near duplicate images 212a-c can be removed from the training images 207.

When the image representation 216 is generated, the image representation 216 can be associated with the click data 214a-c of the near duplicate images 212a-c. For the purposes of training the image relevance model 202, the image representation 216 will appear to have been clicked or otherwise selected by users each instance at which any of the near duplicate images 212a-c were clicked or otherwise selected by users. In some implementations, the click data 214a-c is filtered such that clicks on multiple near duplicate images originating from the same set of search results (e.g., search results 111 shown in FIG. 1) are collapsed into a single click.

In some examples, the image search apparatus 120 may leave some near duplicate images 212a-c unassociated with each other, rather than generate an image representation 216 for the near duplicate images 212a-c. For example, when training image relevance sub-models 204a-e (FIG. 2A), the image search apparatus 120 may choose not to generate an image representation 216 for some near duplicate images 212a-c until after the image relevance sub-models 204a-c have been trained and used to score other images.

The image search apparatus 120, in some examples, may choose a threshold number 218 of near duplicate images 212a-c to collapse into an image representation 216. For example, if the threshold number 218 is ten, the image search apparatus 120 may only collapse up to ten near duplicate images 212a-c into a single image representation 216, and leave the remaining near duplicate images 212a-c uncollapsed, or generate a different image representation 216 for other images among the near duplicate images 212a-c. A single image representation 216 for many near duplicate images 212a-c may appear as a low-scoring "outlier" to an image relevance sub-models 204a-e even if the near duplicate images 212a-c represented by the single image representation 216 are highly relevant to the query 200 represented by the image relevance model 202. For example, the near duplicate images 212a-c may be the most relevant images to a query 200 and also may represent a majority of the training images 207. If the near duplicate images 212a-c are all collapsed into a single image representation 216, the image representation 216 will be absent from the training images subset 206 for one of the image relevance sub-models 204a. Thus, in this image relevance sub-model 204a, the image representation 216 may appear as an outlier relative to the other images in the training images subset 206 and may be incorrectly identified as an outlier in the training images 207. Thus, in this scenario, near duplicate images 212a-c ideally appear in all of the training images subsets 206, and are not collapsed into a single image representation 216.

After the image relevance sub-models 204a-c have been trained and used to score other images, all of the near duplicate images 212a-c can be collapsed into a single image representation 216 regardless of the threshold number 218. For example, the image search apparatus 120 may perform a further refinement process using the single image representation 216.

Figure 3:
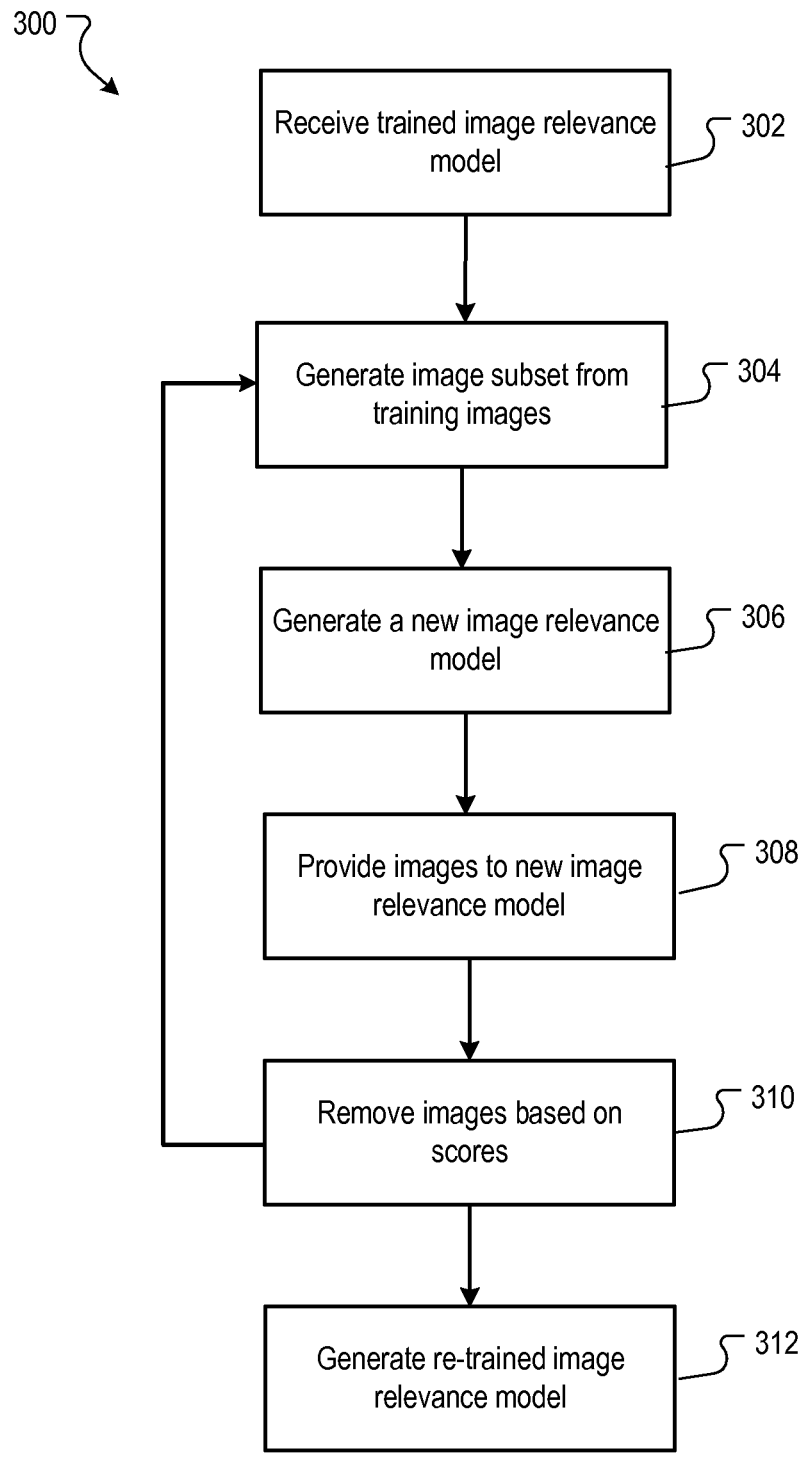
FIG. 3 is a flowchart of an example process for refining an image relevance model.

FIG. 3 is a flowchart of an example process 300 for refining an image relevance model. The operations of the process 300 can be performed, for example, by an image search apparatus 120.

At operation 302, the image search apparatus receives a trained image relevance model (e.g. one of the trained image relevance models 112 shown in FIG. 1). The image relevance model may have been trained by a set of training images identified as relevant to a particular query. In particular, the image relevance model may have been trained based on content feature values of the set of training images, and each of the queries is a unique set of one or more query terms received by the image search apparatus as a query input.

In some implementations, the image search apparatus generates an aggregation of near duplicate images among the set of training images and associates image selection data of the near duplicate images with the aggregation of the near duplicate images. The aggregation can include fewer than a threshold number of near duplicate images.

At operation 304, the image search apparatus generates a subset of the training images. For example, the subset can contain a percentage of the original training images, e.g., N % of the original training images, where N may be a number greater than 50% such as 75% or 95%.

At operation 306, the image search apparatus generates a new image relevance model using the subset of the training images. The new image relevance model can be trained based on content feature values of the subset of the training images.

At operation 308, the image search apparatus 120 provides images to the new image relevance model for scoring. For example, the image search apparatus 120 can provide the images not in the subset of training images (e.g., the remaining 100–N % of images not in the subset).

At operation 310, the image search apparatus can remove images from the original set of training images based on the scores determined by the new image relevance model. For example, images having a score below a threshold can be identified as low-scoring images (i.e. outlier images) and removed.

Operations 304-310 can be repeated until all of the images in the original set of training images have been scored against one of the new image relevance models. When multiple distinct subsets are used to train multiple new image relevance models, each of the multiple distinct subsets can include at least one image that is not included in another distinct subset.

At operation 312, once all of the images in the original set of training images have been scored, the image search apparatus 120 can generate a re-trained image relevance model using the set of training images that has the low-scoring images removed.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on a computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
obtaining a trained image relevance model that generates relevance measures of images to a query; and
re-training the image relevance model, the re-training comprising:
generating an aggregation of near duplicate images among a set of training images;
associating image selection data of the aggregated near duplicate images with the aggregation of the near duplicate images, the image selection data corresponding to user interactions with the near duplicate images when the near duplicate images were presented as search results; and
generating a re-trained image relevance model based on content feature values of each image in the aggregation of near duplicate images and the image selection data associated with the aggregation of near duplicate images.

2. The method of claim 1, wherein generating an aggregation of near duplicate images comprises including fewer than a specified number of near duplicate images in the aggregation.

3. The method of claim 1, further comprising generating multiple distinct portions of the set of training images, wherein each of the multiple distinct portions is generated to include fewer than all of the images in the set of training images.

4. The method of claim 3, wherein generating a re-trained image relevance model comprises generating, for each distinct portion, based on content feature values of the distinct portion and the image selection data associated with the aggregation of near duplicate images included in the distinct portion.

5. The method of claim 2, further comprising:
identifying, for each of a plurality of images, a measure of relevance of the image to the query;
comparing the measure of relevance of each image to a relevance threshold; and
selecting the set of training images based on the comparison, wherein the images associated with the measure of relevance exceeding the relevance threshold are included in the set of training images.

6. The method of claim 5, comprising determining the measure of relevance based, in part, on a click frequency of the image when presented as an image search result for the query.

7. The method of claim 2, wherein generating a re-trained image relevance model based on content feature values of the aggregation of near duplicate images and the image selection data associated with the aggregation of near duplicate images comprises generating the re-trained image relevance model based on content features of a single representation of the aggregation of near duplicate images and a single selection value based on the image selection data of the aggregation of near duplicate images.

8. A system, comprising:
a data processing apparatus; and a memory coupled to the data processing apparatus having instructions stored thereon which, when executed by the data processing apparatus cause the data processing apparatus to perform operations comprising:

obtaining a trained image relevance model that generates relevance measures of images to a query; and re-training the image relevance model, the re-training comprising:

generating an aggregation of near duplicate images among a set of training images;

associating image selection data of the aggregated near duplicate images with the aggregation of the near duplicate images, the image selection data corresponding to user interactions with the near duplicate images when the near duplicate images were presented as search results; and generating a re-trained image relevance model based on content feature values of each image in the aggregation of near duplicate images and the image selection data associated with the aggregation of near duplicate images.

9. The system of claim 8, wherein generating an aggregation of near duplicate images comprises including fewer than a specified number of near duplicate images in the aggregation.

10. The system of claim 8, wherein:

the instructions cause the data processing apparatus to perform operations further comprising generating multiple distinct portions of the set of training images; and each of the multiple distinct portions is generated to include fewer than all of the images in the set of training images.

11. The system of claim 10, wherein generating a re-trained image relevance model comprises generating, for each distinct portion, based on content feature values of the distinct portion and the image selection data associated with the aggregation of near duplicate images included in the distinct portion.

12. The system of claim 8, wherein the instructions cause the data processing apparatus to perform operations further comprising:

identifying, for each of a plurality of images, a measure of relevance of the image to the query;

comparing the measure of relevance of each image to a relevance threshold; and selecting the set of training images based on the comparison, wherein the images associated with the measure of relevance exceeding the relevance threshold are included in the set of training images.

13. The system of claim 12, wherein the instructions cause the data processing apparatus to perform operations further comprising determining the measure of relevance based, in part, on a click frequency of the image when presented as an image search result for the query.

14. The system of claim 8, wherein generating a re-trained image relevance model based on content feature values of the aggregation of near duplicate images and the image selection data associated with the aggregation of near duplicate images comprises generating the re-trained image relevance model based on content features of a single representation of the aggregation of near duplicate images and a single selection value based on the image selection data of the aggregation of near duplicate images.

15. A non-transitory computer readable medium storing instructions that when executed by a data processing apparatus cause the data processing apparatus to perform operations comprising:

obtaining a trained image relevance model that generates relevance measures of images to a query; and re-training the image relevance model, the re-training comprising:

generating an aggregation of near duplicate images among a set of training images;

associating image selection data of the aggregated near duplicate images with the aggregation of the near duplicate images, the image selection data corresponding to user interactions with the near duplicate images when the near duplicate images were presented as search results; and generating a re-trained image relevance model based on content feature values of each image in the aggregation of near duplicate images and the image selection data associated with the aggregation of near duplicate images.

16. The computer readable medium of claim 15, wherein generating an aggregation of near duplicate images comprises including fewer than a specified number of near duplicate images in the aggregation.

17. The computer readable medium of claim 15 wherein:

the instructions cause the data processing apparatus to perform operations further comprising generating multiple distinct portions of the set of training images; and each of the multiple distinct portions is generated to include fewer than all of the images in the set of training images.

18. The computer readable medium of claim 17, wherein generating a re-trained image relevance model comprises generating, for each distinct portion, based on content feature values of the distinct portion and the image selection data associated with the aggregation of near duplicate images included in the distinct portion.

19. The computer readable medium of claim 15, wherein the instructions cause the data processing apparatus to perform operations further comprising:

identifying, for each of a plurality of images, a measure of relevance of the image to the query;

comparing the measure of relevance of each image to a relevance threshold; and selecting the set of training images based on the comparison, wherein the images associated with the measure of relevance exceeding the relevance threshold are included in the set of training images.

20. The computer readable medium of claim 19, wherein the instructions cause the data processing apparatus to perform operations further comprising determining the measure of relevance based, in part, on a click frequency of the image when presented as an image search result for the query.

* * * * *